(12) United States Patent
Ueo (10) Patent No.: US 9,889,758 B2
(45) Date of Patent: Feb. 13, 2018

(54) CHARGING SYSTEM, VEHICLE, AND CHARGING FACILITY

(71) Applicant: TOYOTA JIDOSHA KABUSHIKI KAISHA, Toyota-shi, Aichi-ken (JP)

(72) Inventor: Daisuke Ueo, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 113 days.

(21) Appl. No.: 14/912,696

(22) PCT Filed: Aug. 12, 2014

(86) PCT No.: PCT/IB2014/001509
§ 371 (c)(1),
(2) Date: Feb. 18, 2016

(87) PCT Pub. No.: WO2015/025201
PCT Pub. Date: Feb. 26, 2015

(65) Prior Publication Data
US 2016/0207409 A1    Jul. 21, 2016

(30) Foreign Application Priority Data
Aug. 19, 2013    (JP) ................................ 2013-169632

(51) Int. Cl.
*H02J 7/00*    (2006.01)
*B60L 11/18*    (2006.01)
(Continued)

(52) U.S. Cl.
CPC ............ *B60L 11/1838* (2013.01); *B60L 7/14* (2013.01); *B60L 11/123* (2013.01); *B60L 11/14* (2013.01);
(Continued)

(58) Field of Classification Search
CPC ............ Y02T 10/7005; Y02T 10/7011; Y02T 10/7055; Y02T 50/53; Y02T 90/14;
(Continued)

(56) References Cited

U.S. PATENT DOCUMENTS

2011/0001356 A1*   1/2011   Pollack ............... B60L 11/1842
                                                              307/31
2011/0285349 A1*  11/2011   Widmer ................ B60L 11/182
                                                              320/108
(Continued)

FOREIGN PATENT DOCUMENTS

JP    2011-072081 A    4/2011
JP    2012-191825 A   10/2012
(Continued)

Primary Examiner — Binh Tat
(74) Attorney, Agent, or Firm — Oliff PLC (57) ABSTRACT

A charging system includes a vehicle, a charging/discharging connector, a detector, and an informing portion. The vehicle is equipped with an electric power storage device, and also includes an inlet for charging the electric power storage device. The charging/discharging connector is a connector that is attached to and detached from the inlet and that is connected to the inlet in a fully fitted state, in which charging can be performed, and a half-fitted state, in which charging is not allowed. The detector includes an electronic control unit for detecting whether a connecting state of the charging/discharging connector is the fully fitted state or the half-fitted state. The informing portion includes an indicator for informing a user of abnormal connection of the charging/discharging connector on the basis of a detection result of the electronic control unit when connection of the charging/discharging connector is the half-fitted state.

8 Claims, 7 Drawing Sheets

(51) Int. Cl.
- *B60L 7/14* (2006.01)
- *B60L 11/12* (2006.01)
- *B60L 11/14* (2006.01)
- *B60L 15/20* (2006.01)

(52) U.S. Cl.
CPC ....... *B60L 11/1816* (2013.01); *B60L 11/1818* (2013.01); *B60L 11/1824* (2013.01); *B60L 11/1842* (2013.01); *B60L 11/1846* (2013.01); *B60L 15/20* (2013.01); *H02J 7/0036* (2013.01); *B60L 2210/10* (2013.01); *B60L 2210/30* (2013.01); *B60L 2210/40* (2013.01); *B60L 2220/14* (2013.01); *B60L 2230/16* (2013.01); *B60L 2230/22* (2013.01); *B60L 2250/10* (2013.01); *B60L 2250/16* (2013.01); *B60L 2270/20* (2013.01); *Y02E 60/721* (2013.01); *Y02T 10/6217* (2013.01); *Y02T 10/645* (2013.01); *Y02T 10/7005* (2013.01); *Y02T 10/7077* (2013.01); *Y02T 10/7088* (2013.01); *Y02T 10/7216* (2013.01); *Y02T 10/7241* (2013.01); *Y02T 10/7275* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(58) Field of Classification Search
CPC ............... Y02T 90/127; Y02T 10/7088; Y02T 10/7241; Y02T 10/725; Y02T 10/646; H02J 5/005; H02J 17/00; H02J 7/35; H02J 7/025; H02J 3/383; H02J 7/0068; H02J 3/005; H02J 9/061; H02J 50/12; H02J 7/0052; H02J 50/80; H02J 50/90
USPC .................................................. 320/106–115
See application file for complete search history.

(56) References Cited

U.S. PATENT DOCUMENTS

| | | | |
|---|---|---|---|
| 2012/0043935 A1* | 2/2012 | Dyer | ................... B60L 1/003 320/109 |
| 2013/0088198 A1 | 4/2013 | Masuda | |
| 2014/0210449 A1 | 7/2014 | Ichikawa et al. | |

FOREIGN PATENT DOCUMENTS

| | | |
|---|---|---|
| JP | 2013-051754 A | 3/2013 |
| JP | 2013-081324 A | 5/2013 |
| JP | 2013-085335 A | 5/2013 |
| WO | 2013/030646 A2 | 3/2013 |

\* cited by examiner

CHARGING SYSTEM, VEHICLE, AND CHARGING FACILITY

BACKGROUND OF THE INVENTION

1. Field of the Invention

The present invention relates to a charging system, a vehicle, and a charging facility, and in particular to a charging system of a vehicle that is configured to be able to charge an electric power storage device equipped in the vehicle from the outside of the vehicle through a charging connection portion.

2. Description of Related Art

In recent years, electric vehicles and plug-in hybrid vehicles have been available that are each configured to be able to charge an electric power storage device equipped in the vehicle from the outside.

Japanese Patent Application Publication No. 2013-085335 (JP 2013-085335 A) discloses a charging system of a vehicle that can improve user convenience by a simple and efficient configuration. In this charging system, a charger is configured to be able to convert electric power from an external electric power source to charged electric power in an electric power storage device. Based on a remaining capacity of the electric power storage device, a power management ECU computes a charging time in a case where the electric power storage device is charged by specified electric power that is set in advance, and also sets a charging start time according to an estimated charging completion time, which is input by a user in an input portion, and the charging time. When the charging start time comes, the power management ECU controls the charger so as to supply the specified electric power to the electric power storage device.

In the charging system disclosed in the above publication, the user connects a charging connector to an inlet of the vehicle when charging is started. In recent years, an attempt has been made to supply the electric power to a household from an electric vehicle or the like in a time of disaster or the like. Here, there is a case where, when the user connects the connector to the inlet, the connector is half-fitted to the inlet. However, a conventional charging system does not provide means for informing the user of this half-fitted state. Consequently, the user falsely assumes it is ready for charging or discharging despite the fact that the connector is half-fitted to the inlet. Thus, the connector may be left half-fitted as the user considers that charging or discharging is performed normally.

SUMMARY OF THE INVENTION

In view of the above problem, the present invention provides a charging system, a vehicle, and a charging facility that can inform a user of a half-fitted state of a connector.

According to one aspect of the present invention, a charging system is provided that includes a vehicle, a connector, a detector, and an informing portion. The vehicle is equipped with an electric power storage device, and is also provided with a charging connection portion that charges the electric power storage device. The connector is configured to (a) be attached to and detached from the charging connection portion and (b) be connected to the charging connection portion in either a fully fitted state, charging be able to be performed in the fully fitted state, the charging being not allowed in the half-fitted state. The detector is configured to detect whether a connecting state of the connector is the fully fitted state or the half-fitted state. The informing portion is configured to inform a user of abnormal connection of the connector based on a detection result of the detector when the connecting state of the connector is the half-fitted state.

The detector may be provided in the vehicle. The detector may be configured to detect the connecting state of the connector based on a first signal and a second signal, the first signal and the second signal being provided from the connector via the charging connection portion. The detector may be configured activate the informing portion when either one of the first signal and the second signal indicates the half-fitted state.

The first signal may be a signal that (a) indicates presence or absence of the connection of the connector to the charging connection portion, and (b) is detected by both of the vehicle and a charging facility. The second signal may be a signal that (a) indicates whether the connecting state of the connector is the fully fitted state or the half-fitted state in addition to the presence or absence of the connection of the connector to the charging connection portion, and (b) is detected by the vehicle but is not detected by the charging facility. The vehicle includes an electronic control unit and the electronic control unit of the vehicle may be configured to transmit a state of the second signal to the charging facility through communication after detecting the state of the second signal.

The first signal may include a control pilot signal, and the second signal may include a proximity detection signal.

The detector may include the electronic control unit that is arranged in the vehicle. The charging system may further include a home energy management system (HEMS) configured to (a) communicate with the electronic control unit to obtain the state of the second signal and (b) control the informing portion based on the obtained state of the second signal, and the HEMS may be included in a house.

The connector may include a first terminal, a second terminal, a locking portion and an operating portion. The locking portion locks to prevent detachment of the connector from the charging connection portion, and the operating portion is configured such that the user operates the locking portion. The charging connecting portion may include a third terminal and a fourth terminal, the third terminal corresponding to the first terminal, the fourth terminal corresponding to the second terminal. The first signal may go through the first terminal and the third terminal. The operating portion may also function as a transmission switch that changes the second signal in such a manner that the second signal indicates the half-fitted state when the locking portion is operated to be unlocked from a properly locked state on the charging connection portion. The second signal may be transmitted to the charging connection portion side through the second terminal and the fourth terminal.

The connector may include a charging/discharging connector that is connected to the charging connection portion in order to charge and discharge the electric power storage device. Furthermore, the informing portion may include an indicator that informs the user of the connection state of the connector by display.

According to another aspect of the present invention, a vehicle that includes an electric power storage device, a charging connection portion, and an electronic control unit is provided. The charging connection portion is configured to charge the electric power storage device from the outside of the vehicle. The electronic control unit is configured to detect whether the connecting state of the connector is the fully fitted state or the half-fitted state, when the connector is connected to the charging connection portion, charging being able to be performed in the fully fitted state, the charging being not allowed in the half-fitted state, and the connector being attachable to and detachable from the charging connection portion. The electronic control unit is configured to activate the informing portion that informs a user of the abnormal connection of the connector when the connecting state of the connector is the half-fitted state.

According to yet another aspect of the present invention, the charging facility for charging a vehicle that includes an electric power storage device, a charging connection portion, and an electronic control unit is provided. Here, the charging connection portion is configured to charge the electric power storage device from the outside of the vehicle. The electronic control unit is configured to detect whether a connecting state of a connector is a fully fitted state or a half-fitted state, when the connector is connected to the charging connection portion, charging being able to be performed in the fully fitted state, the charging being not allowed in the half-fitted state, and the connector being attachable to and detachable from the charging connection portion. Then, the charging facility includes a home energy management system (HEMS) and an informing portion. The HEMS is configured to communicate with the electronic control unit to obtain the connecting state of the connector. The informing section is configured to (a) be controlled by the HEMS, and (b) inform a user of the abnormal connection of the connector when the connecting state of the connector is the half-fitted state.

According to the charging system, the vehicle, and the charging facility as described above, the user can be informed when the connector is brought into the half-fitted state. Accordingly, it is possible to prevent a situation where the user does not notice the half-fitted state of the connector and thus the connector is left unattended in the half-fitted state for a long time.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A detailed description will hereinafter be made on an embodiment of the present invention with reference to the drawings. It should be noted that same or corresponding portions in the drawings are denoted by same reference numerals, and a description thereof will not be repeated.

Figure 1:
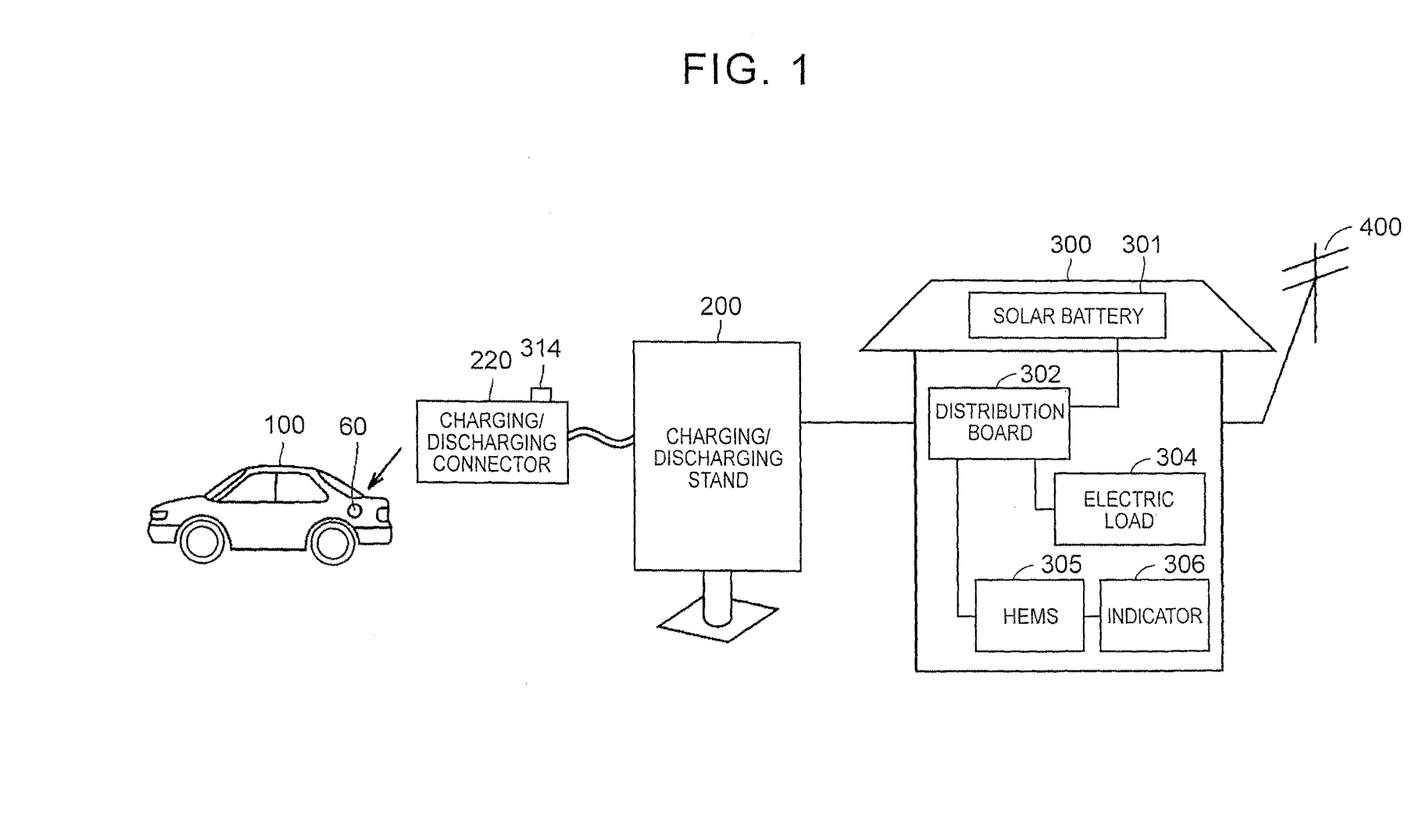
FIG. 1 is a view for showing a configuration of an electric power supply system which is an embodiment of the present invention and to which a vehicle and an electric power receiving device are applied.

FIG. 1 is a view for showing a configuration of an electric power supply system which is the embodiment of the present invention and to which a vehicle and an electric power receiving device are applied. Referring to FIG. 1, the electric power supply system includes a vehicle 100, a charging/discharging stand 200, a distribution board 302 that is provided in a house 300, a home energy management system (HEMS) 305 that is connected to the distribution board, and an indicator 306 that is an example of an informing device. An electric load 304 is connected to the distribution board 302 via a socket and the like.

The vehicle 100 is provided with an electric power cable connecting port 60 (hereinafter referred to as an inlet 60) that is an example of a charging connection portion. A charging/discharging connector 220, which is an example of a connector, can be connected to the inlet 60.

The charging/discharging stand 200 is arranged between the charging/discharging connector 220 and the distribution board 302. The charging/discharging stand is arranged near a parking space of the vehicle. However, when the house 300 is near the parking space, the charging/discharging stand may be arranged in the house or may be integrated with the distribution board 302.

In a normal mode (or a V2H mode), the HEMS 305 charges the vehicle from the house, or the house receives a supply of electric power from the vehicle, in accordance with shortage or surplus of the electric power that is determined in consideration of the electric power used by the electric load 304 in the house and the electric power generated by a solar battery 301 in the house 300. In addition, in the normal mode, such control may be executed that the vehicle is charged at midnight and the house is supplied with the electric power from the vehicle during electric power peak in a case where a price of electricity varies by time-of-day.

In an emergency mode, the electric power is supplied from the vehicle 100 to the house 300 through the charging/discharging stand 200 and the distribution board 302.

The electric power supplied from the vehicle 100 to a household is 100-V or 200-V AC power, for example. However, the voltage is not limited to this but may appropriately be changed.

The indicator 306, which is under control of the HEMS 305, indicates a power generating condition of the solar battery 301, electric power consumption of the electric load, a connecting state with the vehicle, and the like.

Figure 2:
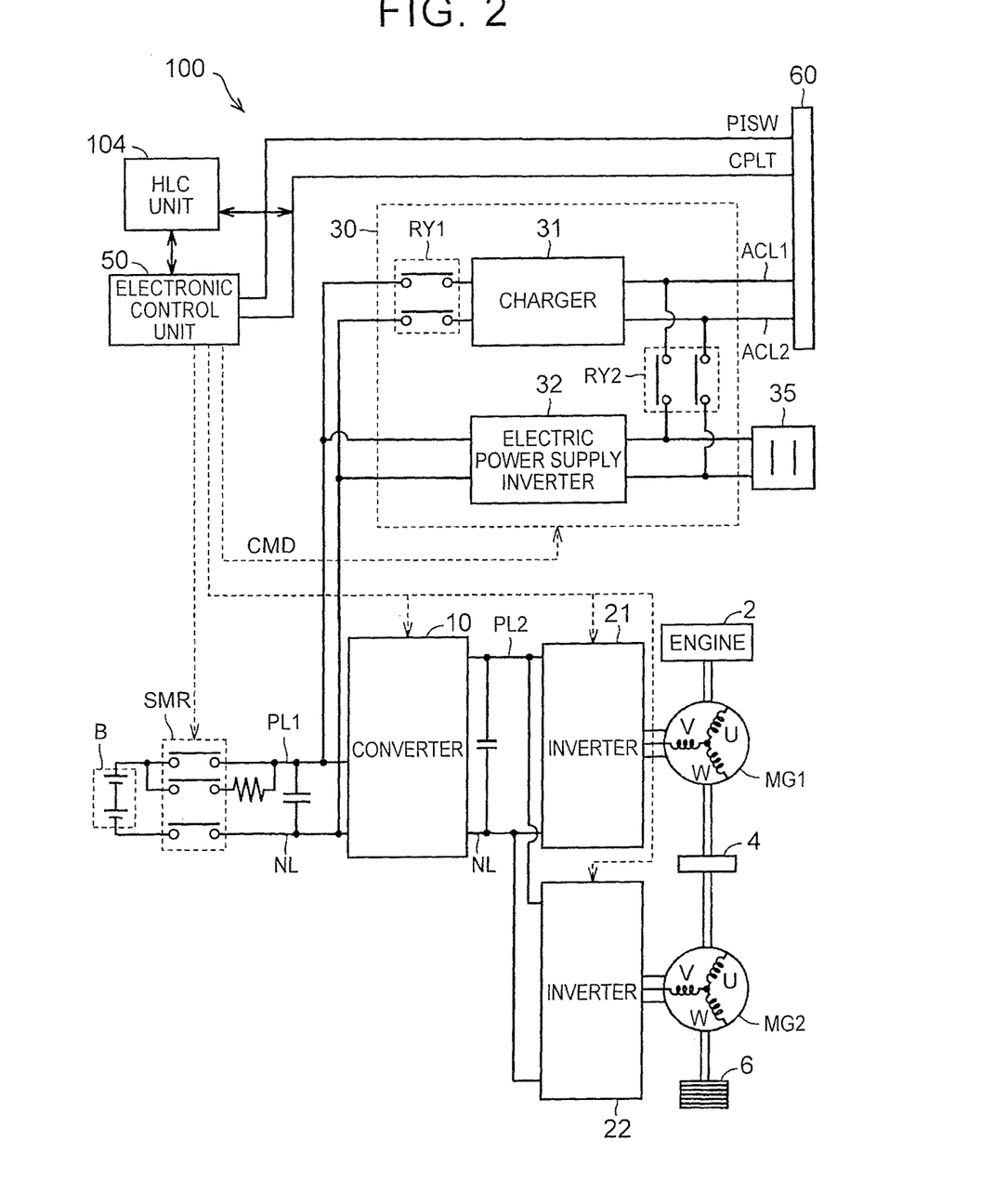
FIG. 2 is a block diagram for showing a configuration of the vehicle that is shown in FIG. 1.

FIG. 2 is a block diagram for showing a configuration of the vehicle 100. Although the following description is made on a case where the vehicle in this embodiment is a hybrid vehicle, the vehicle of the present invention is not limited to the hybrid vehicle, and the vehicle may be an electric vehicle or a fuel cell vehicle.

Referring to FIG. 2, the vehicle 100 includes an engine 2, motor generators MG1, MG2, a power dividing device 4, and a drive wheel 6.

The vehicle 100 further includes an electric power storage device B, a system main relay SMR, a converter 10, inverters 21, 22, an electronic control unit 50, a high level communication (HLC) unit 104, an electric power converter 30, a socket 35, and the inlet 60. The HLC unit 104 superimposes a high-frequency waveform on a control pilot signal CPLT to perform communication.

The vehicle 100 is a hybrid vehicle that travels by the engine 2 and the motor generator MG2 as drive power sources. The drive power generated by the engine 2 and the motor generator MG2 is transmitted to the drive wheel 6.

The engine 2 is an internal combustion engine, such as a gasoline engine or a diesel engine, that combusts fuel to outputs the power. The engine 2 is configured such that an operation state such as a throttle operation amount (an intake air amount), a fuel supply amount, or ignition timing can electrically be controlled by a signal from the electronic control unit 50.

Each of the motor generators MG1, MG2 is an AC rotary machine and is, for example, a three-phase AC synchronous motor. The motor generator MG1 is used as a generator that is driven by the engine 2, and is also used as the rotary machine that can start the engine 2. The electric power that can be obtained as a result of electric power generation by the motor generator MG1 can be used to drive the motor generator MG2. In addition, the electric power that can be obtained as a result of the electric power generation by the motor generator MG1 can also be supplied to an external equipment that is connected to the vehicle 100. Meanwhile, the motor generator MG2 is mainly used as the rotary machine that drives the drive wheel 6 of the vehicle 100.

The power dividing device 4, for example, includes a planetary gear train that has three rotational shafts of a sun gear, a carrier, and a ring gear. The sun gear is connected to a rotational shaft of the motor generator MG1. The carrier is connected to a crankshaft of the engine 2. The ring gear is connected to a drive shaft. The power dividing device 4 divides the drive power of the engine 2 into power that is transmitted to the rotational shaft of the motor generator MG1 and power that is transmitted to the drive shaft. The drive shaft is connected to the drive wheel 6. In addition, the drive shaft is also connected to a rotational shaft of the motor generator MG2.

The electric power storage device B is a chargeable/dischargeable DC power source, and is configured, for example, by a secondary battery such as a nickel hydrogen battery or a lithium ion battery, a capacitor, or the like. The electric power storage device B supplies the electric power to the converter 10, and is charged by the electric power from the converter 10 during electric power regeneration.

The system main relay SMR is provided between the electric power storage device B and the converter 10. The system main relay SMR electrically connects/disconnects between the electric power storage device B and an electrical system, and is controlled to be turned ON/OFF by the electronic control unit 50.

The converter 10 increases the voltage from the electric power storage device B and supplies the increased voltage to the inverters 21, 22. The converter 10 also reduces the voltage that is generated by the motor generators MG1, MG2 and rectified by the inverters 21, 22, so as to charge the electric power storage device B.

The inverters 21, 22 are connected to each other in parallel with the converter 10. The inverters 21, 22 are controlled by a signal from the electronic control unit 50. The inverters 21, 22 convert the DC power supplied from the converter 10 to the AC power, and respectively drive the motor generators MG1, MG2.

The electric power converter 30 is configured such that it can supply/receive the electric power to/from an external equipment (not shown) that is connected to the inlet 60. The electric power converter 30 is further configured such that it can supply the electric power to electrical equipment that is connected to the socket 35 provided in a vehicle cabin. Meanwhile, the electric power converter 30 is connected to the inlet 60 and the socket 35 in one side. Furthermore, the electric power converter 30 is connected to a positive electrode line PL1 and a negative electrode line NL between the system main relay SMR and the converter in the other side. Here, the electric power converter 30 may be connected to an electric power line between the electric power storage device B and the system main relay SMR. The electric power converter 30 includes a charger 31, an electric power supply inverter 32, and relays RY1, RY2.

The charger 31 is connected to the inlet 60 via electric power lines ACL1, ACL2, and is also connected to the positive electrode line PL1 and the negative electrode line NL via the relay RY1. Based on a signal CMD from the electronic control unit 50, the charger 31 converts charging electric power that is supplied from the external equipment connected to the inlet 60 to the electric power in a voltage level of the electric power storage device B, and outputs the electric power to the electric power storage device B, so as to charge the electric power storage device B. Charging of the electric power storage device B by the electric power of the external equipment is also hereinafter be referred to as "external charging".

While an input side of the electric power supply inverter 32 is connected to the positive electrode line PL1 and the negative electrode line NL, an output side thereof is connected to the inlet 60 via the relay RY2 and the electric power lines ACL1, ACL2. The output side of the electric power supply inverter 32 is further connected to the socket 35.

The electric power supply inverter 32 can convert stored electric power in the electric power storage device B to supplied electric power that is supplied to the electrical equipment connected to the socket 35, and can output the thus-converted electric power to the electrical equipment.

In the emergency mode or during discharging in the normal mode, the electric power supply inverter 32 can convert at least either of the stored electric power in the electric power storage device B or the generated electric power of the motor generator MG1 to the supplied electric power, and can output the thus-converted electric power to the house or the like through the charging/discharging connector 220, which is connected to the inlet 60 (see FIG. 1).

The voltage and an upper limit current are determined in the electric power supply inverter 32 on the basis of a control signal from the electronic control unit 50.

In this specification, to output at least either of the electric power in the electric power storage device B or the generated electric power of the motor generator MG1 from the vehicle to the load or the household on the outside of the vehicle is referred to as "electric power supply".

Each of the relays RY1, RY2 is opened/closed on the basis of the signal CMD from the electronic control unit 50. The relay RY1 is ON during charging from the outside, and is OFF during the electric power supply to the outside. Meanwhile, the relay RY2 is OFF during charging from the outside, and is ON during the electric power supply to the outside.

The inlet 60 is configured such that it can serve as an electric power supply port that is used to supply the electric power of the vehicle 100 to the external load, the household, or the like and can also serve as a charging port that is used to charge the vehicle 100 from an external electric power source. As it will be described below in FIG. 4, the inlet 60 includes terminals T9, T10, to which the electric power line is connected, and also includes terminals T3, T4, to which a signal line for transmitting signals PISW and CPLT is connected. The proximity detection signal PISW is a signal that is used to detect on the vehicle side whether the charging/discharging connector 220 of a cable, which is connected to the external equipment, is fitted to the inlet 60. Meanwhile, the control pilot signal CPLT is a signal that indicates whether the charging/discharging connector 220 is connected to the inlet 60 and that also communicates a capacity of the electric power cable and the like.

The electronic control unit 50 determines target drive power that is transmitted to the drive wheel 6 on the basis of an accelerator pedal operation amount, a brake pedal depression amount, a vehicle speed, or the like. Then, the electronic control unit 50 controls the engine 2 and the motor generators MG1, MG2 such that the vehicle is brought into a traveling state in which the target drive power can be output efficiently. Furthermore, when the external load or the external electric power source is connected to the inlet 60, the electronic control unit 50 controls the electric power converter 30 and the relays RY1, RY2, thereby switching between the charging from the outside and the electric power supply to the outside for execution.

Although FIG. 2 shows an example in which the vehicle 100 includes the electric power converter 30, the vehicle is not limited to such a configuration. The vehicle may be configured to output the electric power by another method. For example, the vehicle may be configured such that the inverters 21, 22 and stator coils of the motor generators MG1, MG2 are used to output the electric power from a neutral point of the each stator coil.

Figure 3:
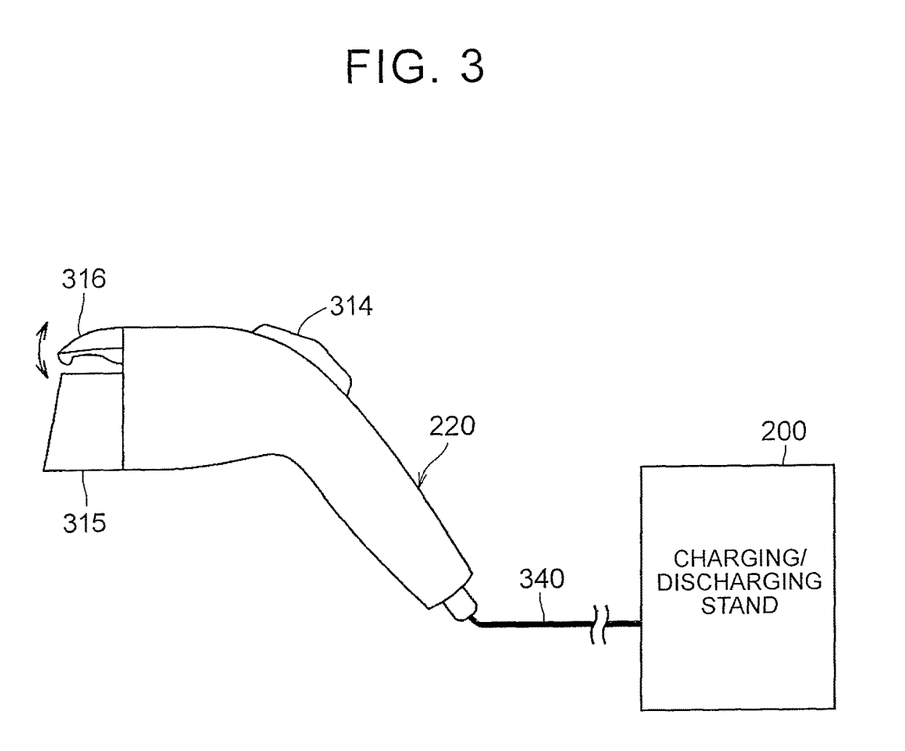
FIG. 3 is an external view of a charging/discharging connector that is shown in FIG. 1.

FIG. 3 is an external view of the charging/discharging connector 220 that is shown in FIG. 1. Referring to FIG. 3, the charging/discharging connector 220 is connected to the charging/discharging stand 200 by an electric line portion 340. In addition, the charging/discharging connector 220 includes an operation button 314, a coupler 315, and a locking claw 316.

The coupler 315 is provided with a plurality of connection terminals (not shown). By connecting the plurality of connection terminals to the inlet 60 of the vehicle 100, an electric power line, a ground line, and a signal line in the electric line portion 340 are respectively connected to the electric power line, a ground line, and the signal line on the vehicle 100 side.

In this embodiment, the operation button 314 is a button used to operate the locking claw 316 that is provided to prevent detachment of the charging/discharging connector 220. The locking claw 316 operates in an interlocking manner with the operation of the operation button 314. The locking claw 316 functions as a locking portion to prevent detachment.

More specifically, once the charging/discharging connector 220 is fully connected to the inlet 60 and thus is brought into a fitted state, the locking claw 316 is locked on a locking claw receiving portion (not shown) on the vehicle 100 side. Accordingly, the charging/discharging connector 220 is prevented from being accidentally detached from the inlet 60. Then, the locking claw 316 is unlocked from the locking claw receiving portion when the operation button 314 is pressed. Accordingly, the charging/discharging connector 220 can be pulled from the inlet 60.

Figure 4:
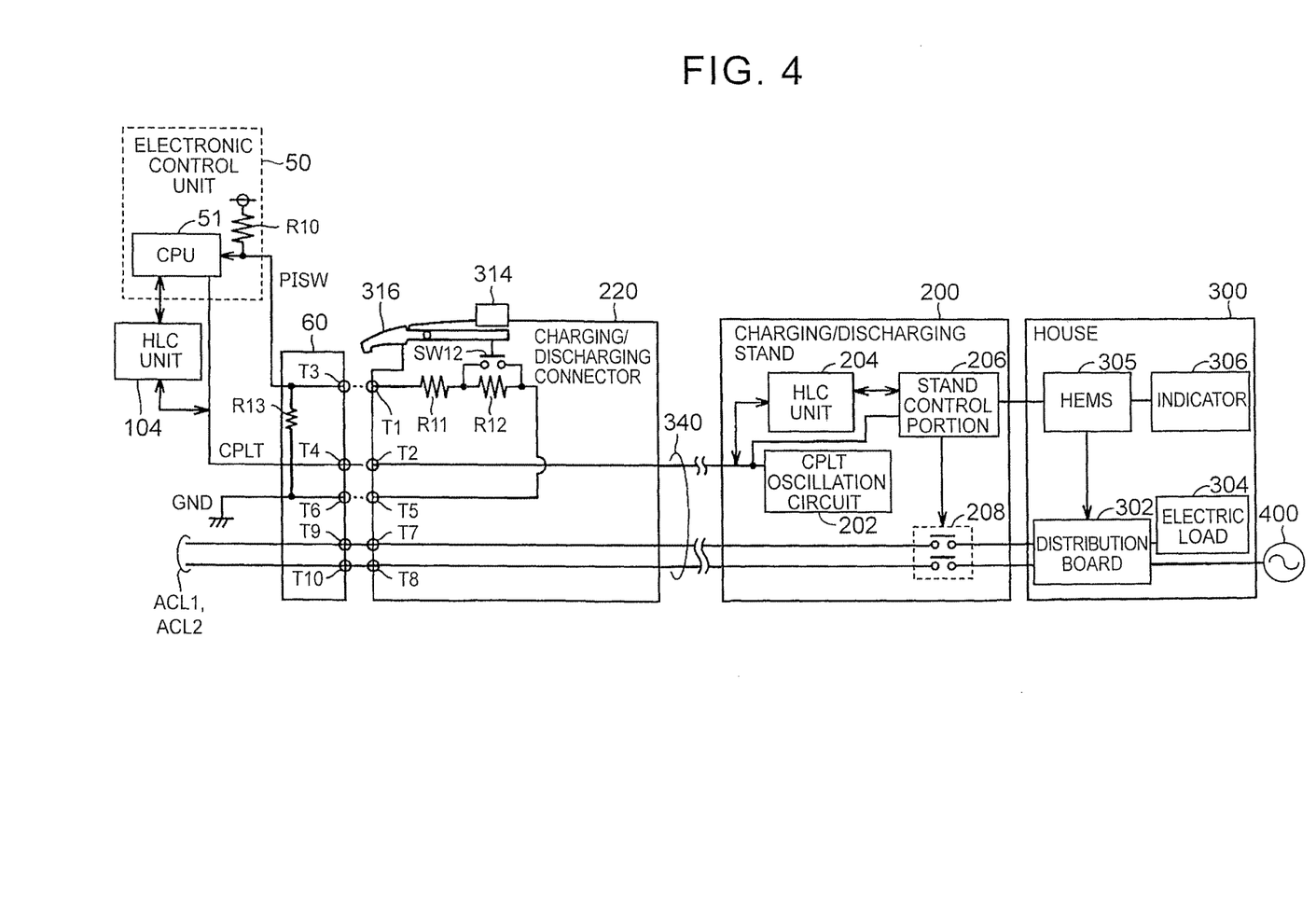
FIG. 4 is a view for showing schematic configurations of the charging/discharging connector, a charging/discharging stand, and a house that are shown in FIG. 1.

FIG. 4 is a view for showing schematic configurations of the charging/discharging connector 220, the charging/discharging stand 200, and the house 300.

Referring to FIG. 4, the house 300 includes the HEMS 305, the distribution board 302, the indicator 306, and the electric load 304. The distribution board 302 is controlled by the HEMS 305, receives the electric power from an electric power system 400, the unillustrated solar battery, or the unillustrated vehicle 100, and supplies the electric power to the electric load 304. The HEMS 305 uses the informing device to inform information on a supply and demand condition of the electric power and information on the connecting state with the vehicle. Such information may be indicated on the indicator 306, which is an example of the informing device.

The charging/discharging stand 200 includes an HLC unit 204, a stand control portion 206, a CPLT oscillator circuit 202, and a relay 208.

The charging/discharging connector 220 includes terminals T1, T2, T5, T7, T8, the operation button 314, the locking claw 316, a switch SW12, and resistors R11, R12.

The resistor R11 and the resistor R12 are connected in series between the terminal T1 and the terminal T5. The switch SW12 is connected in parallel with the resistor R12.

When the charging/discharging connector 220 is connected to the inlet 60, the terminals T1, T2, T5, T7, T8 are respectively connected to the terminals T3, T4, T6, T9, T10.

The terminal T3 is connected to a signal line for the proximity detection signal PISW, and a pull-up resistor R10 and a CPU 51 are connected to this signal line in the electronic control unit 50. The CPU 51 detects the voltage of the proximity detection signal PISW, and can thereby detect if the charging/discharging connector 220 is in an unfitted state, a half-fitted state, or a fitted state.

The terminal T4 is connected to a signal line for the control pilot signal CPLT, and this signal line is connected to the CPU 51 in the electronic control unit 50.

The terminal T6 is connected to a signal line that applies ground potential GND. The terminal T6 is also connected to the terminal T3 via a resistor R13. The terminals T9, T10 are respectively connected to the electric power lines ACL1, ACL2.

The switch SW12 that is installed in the charging/discharging connector 220 is brought into a conductive or non-conductive state in conjunction with the operations of the operation button 314 and the locking claw 316. When the charging/discharging connector 220 is fitted to the inlet 60, the locking claw 316 is locked on the locking claw receiving portion. At this time, the switch SW12 is brought into the non-conductive state.

Meanwhile, when the charging/discharging connector 220 is half-fitted to the inlet 60, the locking claw 316 is lifted by the locking claw receiving portion, that is, the operation button 314 is pressed. In this state, the switch SW12 is brought into the conductive state.

In the charging system for a vehicle configured as above, there is a case where such a condition that the connector of the charging cable is securely connected to the inlet of the vehicle must be satisfied to perform charging. Such a condition is made to prevent damage to or breakdown of the devices that is promoted when loose connection of the connector or disconnection of the connector by a user during charging causes the terminal of the connector to be separated during energization and thereby causes generation of an arc between the terminals.

Accordingly, for example, in such a configuration of the charging/discharging connector 220 shown in FIG. 3, in addition to a state that the terminal of the charging/discharging connector 220 is connected to the terminal of the inlet 60 (that is, a level change of the control pilot signal CPLT), a state that the locking claw 316 of the charging/discharging connector 220 is securely locked on the locking claw receiving portion (that is, the proximity detection signal PISW is ON) may be set as a condition to perform charging. By setting such a condition, it is possible to prevent the connector from being accidentally detached from the inlet during charging. Furthermore, even when the user attempts to detach the connector in the middle of charging, the electric power supply is stopped at a moment when the user operates the operation button to operate the locking claw. Thus, when the terminal of the connector is separated from the terminal of the inlet, the connector is already in the non-conductive state, and the generation of the arc or the like can thereby be prevented.

If the charging performing condition as described above is set, charging is prevented from being performed due to the improper connection of the connector. A specific example of such a case will be described.

First, when the connection of the connector is initiated, connection of the terminals and fitting of the connector are changed in an order of the following (1) to (3).

(1) The terminal T4 and the terminal T2 first contact each other. Either one of the terminal T4 and the terminal T2 is formed in a cylindrical shape, and the other of the terminals is partially inserted therein.

(2) In a state of the above (1), the locking claw 316 is not fitted to a groove that is formed in the inlet 60, and the state of the switch SW12 is same as a state in which the operation button 314 is pressed.

(3) In a state of the above (2), the coupler 315 in FIG. 3 is partially fitted to the annular groove that is formed in the inlet 60. Consequently, the charging/discharging connector 220 seems to be connected to the inlet 60 in appearance.

However, the state of the above (3) corresponds to the state in which the connection of the connector is improper. Here, in a proper state, the connector in the state of the above (3) is further pushed to cause the fitting of the locking claw 316 to the inlet 60, and the switch SW12 is thereby turned OFF.

Thus, charging is not performed when the connection of the connector by the user is insufficient, or when the connector is not fully fitted due to contact failure of the terminal or the like. If the user does not notice that charging is not performed, the user may misunderstand later on that charging is completed. Consequently, there may be a case where, when the user attempts to drive the vehicle, charging has not been performed at all.

In such a case, the user may notice that charging has not been performed after he/she detaches the charging cable. This can cause such inconvenience that the vehicle is not sufficiently charged when it is used.

Accordingly, in this embodiment, in the charging system for the vehicle that can perform external charging by using the charging cable, the user is informed when the connection of the charging/discharging connector 220 of the charging cable is improper. Here, even if the connecting state of the charging/discharging connector 220 is informed by the vehicle, the user may not notice and enter the house. Accordingly, half-fitting of the charging/discharging connector 220 is informed by the indicator 306 in the house, and the user can thereby recognize that charging is not performed.

However, the proximity detection signal PISW is not transmitted from the charging/discharging connector 220 to the charging/discharging stand 200. Accordingly, in order to indicate the connecting state of the charging/discharging connector 220 on the indicator 306, it is necessary to transmit the connecting state of the charging/discharging connector 220 from the vehicle side to the charging/discharging stand 200 and the house 300 side.

Thus, in this embodiment, the vehicle 100 and the charging/discharging stand 200 are respectively provided with the HLC units 104, 204. The information on the connecting state of the charging/discharging connector 220, which is detected by the CPU 51, is superimposed on the control pilot signal CPLT, and the control pilot signal CPLT is then transmitted from the vehicle to the charging/discharging stand 200. Although the HLC units are provided in this embodiment, power line communication (PLC) units may be provided instead to transmit the above information through the electric power line. Alternatively, radio communication units may be provided to transmit the above information.

Figure 5:
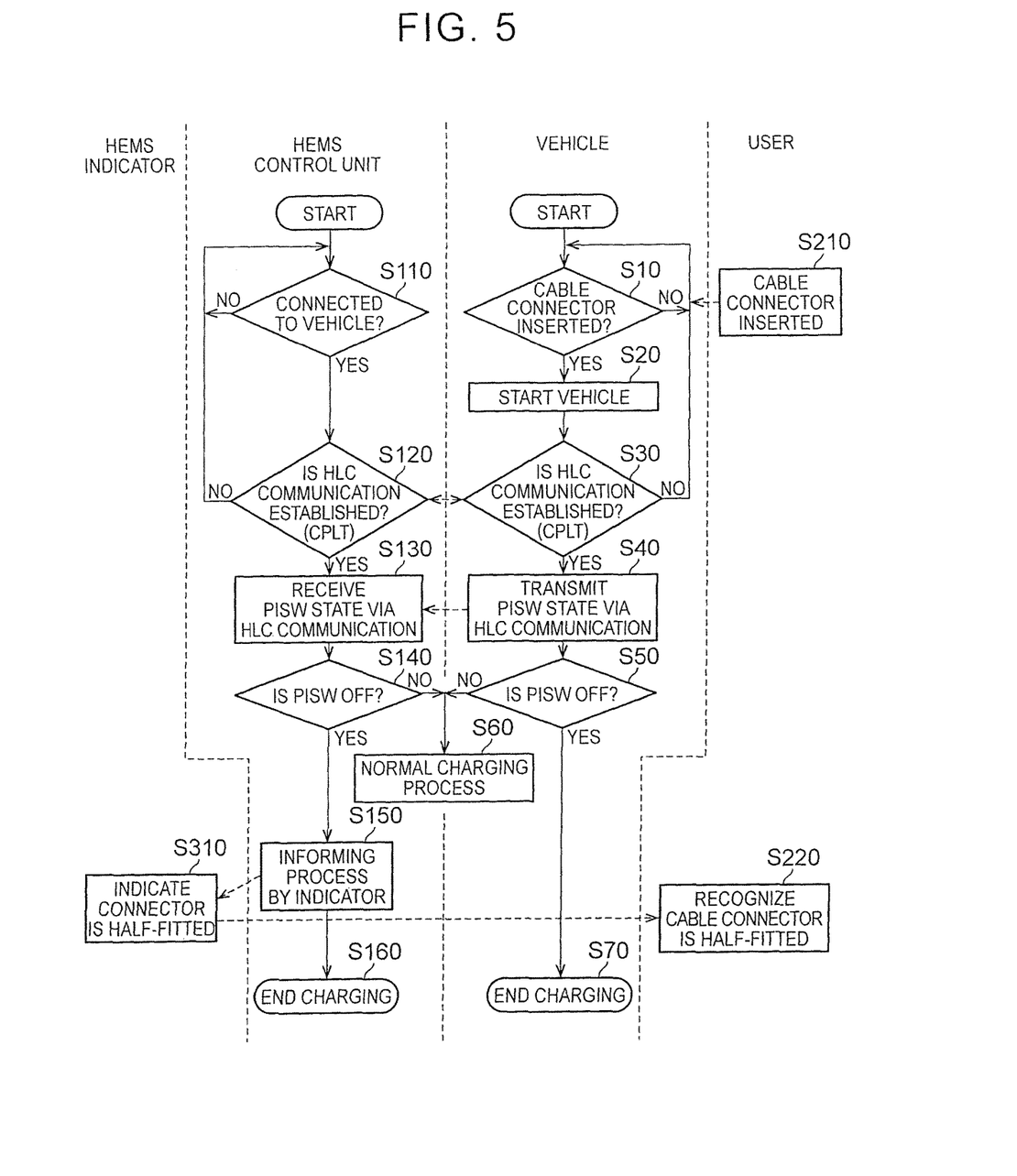
FIG. 5 is a flowchart for illustrating control that is executed in the vehicle and the house at a charging start time.

FIG. 5 is a flowchart for illustrating control that is executed in the vehicle and the house at a charging start time. It should be noted that the half-fitting of the connector can be informed by similar control when the electric power supply from the vehicle is started.

Referring to FIG. 4 and FIG. 5, once the process is started, the electronic control unit 50 in the vehicle detects in a step S10 whether the charging/discharging connector 220 is inserted in the inlet 60. As shown in a step S210, if the user inserts the charging/discharging connector 220 in the inlet 60, the process proceeds to a step S20, and the vehicle is started.

Meanwhile, when the stand control portion 206 detects the voltage of the control pilot signal CPLT, the HEMS 305 detects in a step S110 whether the charging/discharging connector 220 is connected, and receives a result from the stand control portion 206. If it is determined in the step S110 that the charging/discharging connector 220 is connected to the inlet 60 of the vehicle, the process proceeds to a step S120.

In a step S30 and the step S120, HLC communication is attempted between the vehicle and the charging/discharging stand by using the control pilot signal CPLT, and it is determined whether the HLC communication is established. If the HLC communication is not established, the process returns from the step S30 to the step S10, and the process also returns from the step S120 to the step S110.

If it is determined in the step S30 and the step S120 that the HLC communication is established, the process proceeds from the step S30 to a step S40, and the process also proceeds from the step 120 to a step S130.

In the step S40, the state of the proximity detection signal PISW, that is, information on whether the charging/discharging connector 220 is fully fitted or half-fitted is transmitted from the HLC unit 104 of the vehicle to the HLC unit 204 of the charging/discharging stand 200. In the step S130, the HLC unit 204 receives the above information. The received information is transmitted to the HEMS 305 through the stand control portion 206.

In the vehicle, when the process in the step S40 is completed, it is determined in a step S50 whether the proximity detection signal PISW is OFF (a state that indicates the half-fitting of the connector). If the proximity detection signal PISW is ON, the process proceeds to a step S60, and a normal charging process is started. On the other hand, if the proximity detection signal PISW is OFF, the process proceeds to a step S70, and charging ends.

Meanwhile, once the process in the step S130 is completed, the HEMS 305 determines in a step S140 whether the proximity detection signal PISW is OFF (the state that indicates the half-fitting of the connector) on the basis of the information received from the vehicle side. If the proximity detection signal PISW is ON, the process proceeds to the step S60, and the normal charging process is started. On the other hand, if the proximity detection signal PISW is OFF, the process proceeds to a step S150. The HEMS 305 makes the indicator 306 perform an informing process to the user, and charging ends in a step S160.

If the informing process is performed in the step S150, the indicator 306 indicates in a step S310 that the charging/discharging connector 220 is half-fitted. For example, a message "Cannot be charged. Be sure to insert connector properly." or the like is displayed on the indicator 306. Alternatively, the user may be informed by sound or alarm. Accordingly, in a step S220, the user can recognize by such display that the charging/discharging connector 220 is half-fitted. Thus, the user can return to the vehicle and insert the charging/discharging connector 220 again when necessary.

Figure 6:
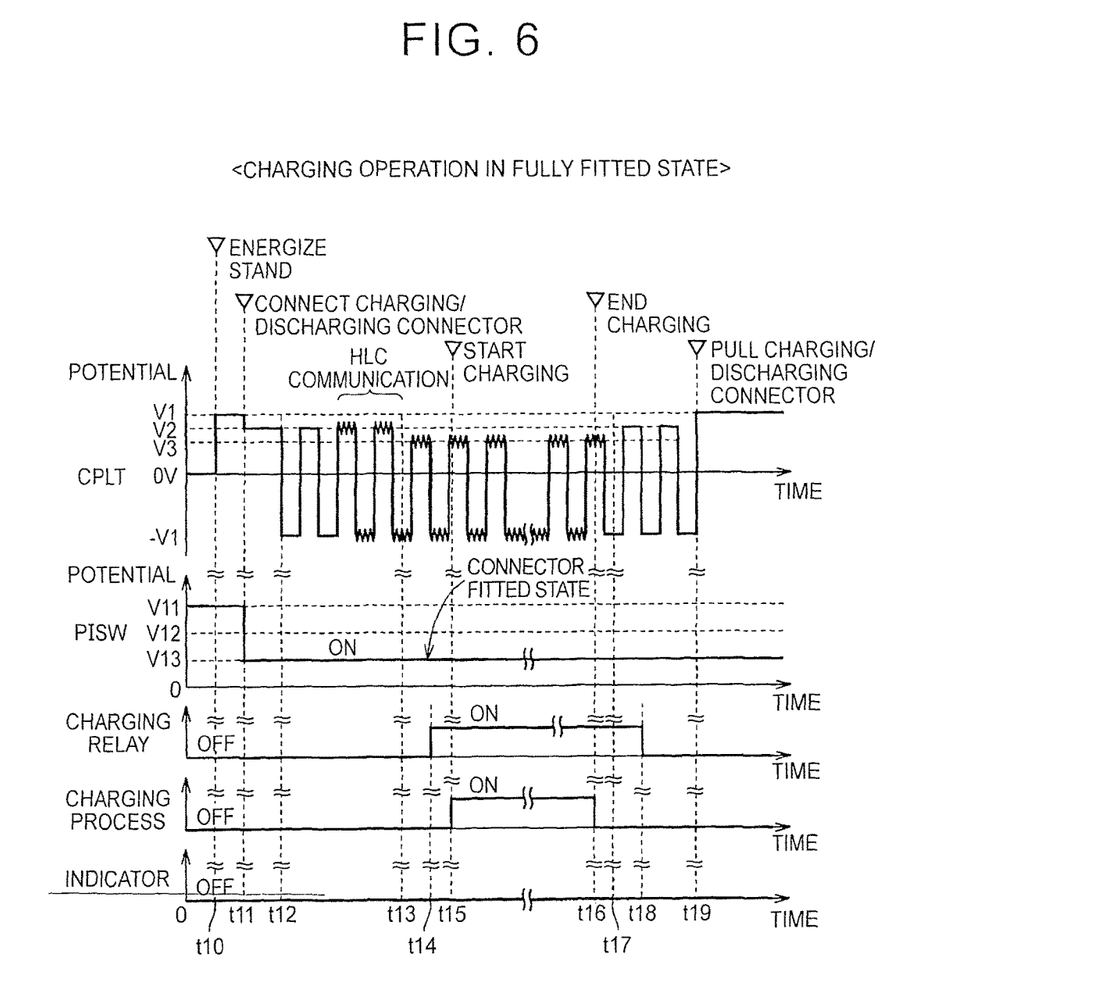
FIG. 6 is a time chart for illustrating an charging operation in a case where the charging/discharging connector is fully connected in a fitted state to an inlet that is provided in the vehicle.

FIG. 6 is a time chart for illustrating an charging operation in a case where the charging/discharging connector 220 is fully connected in the fitted state to the inlet 60.

Figure 7:
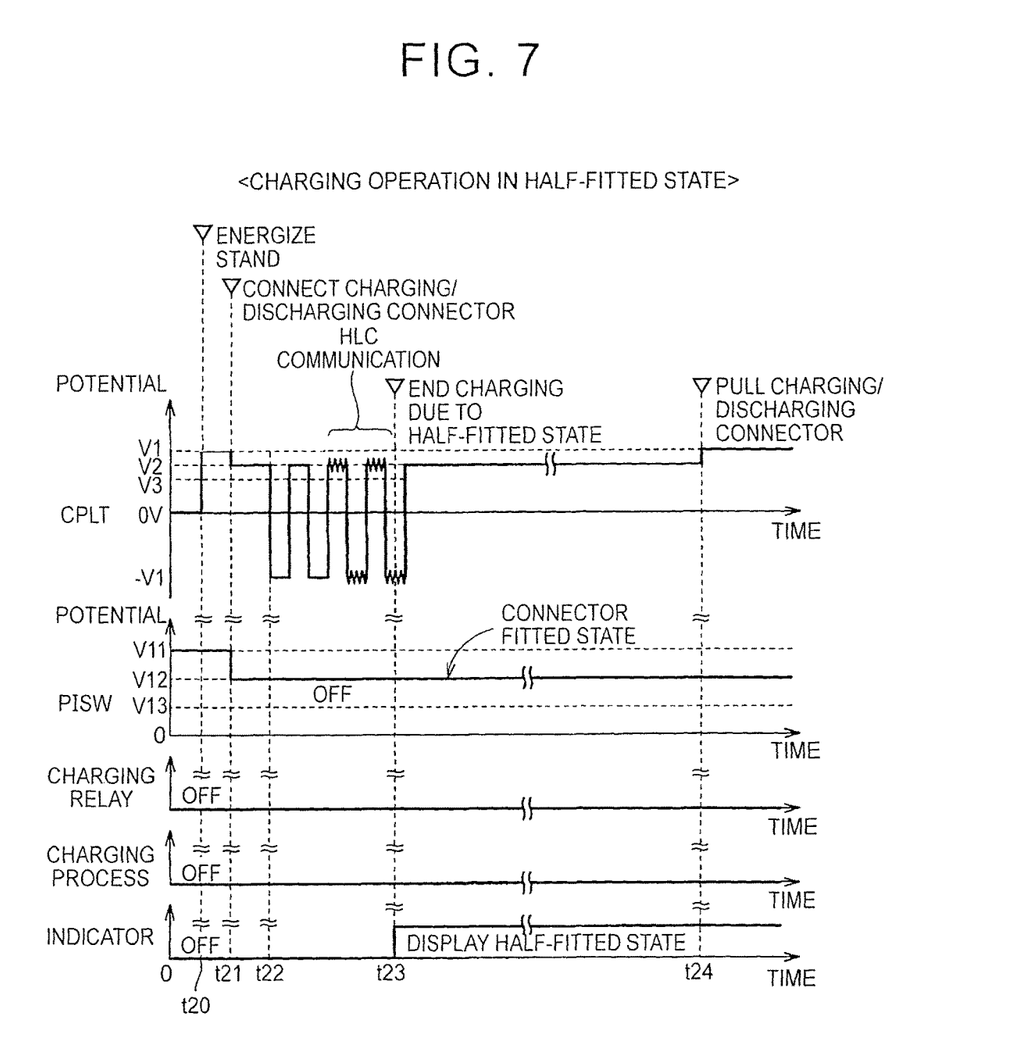
FIG. 7 is a time chart for illustrating an charging operation when the charging/discharging connector is half-fitted to the inlet.

In FIG. 6 and FIG. 7, which will be described below, a horizontal axis indicates time while a vertical axis indicates potential of the pilot signal CPLT, potential of the signal PISW, a state of the charging relay, a state of the charging process, and a state of the indicator.

Referring to FIG. 4 and FIG. 6, the charging/discharging connector 220 is not connected to the vehicle 100 and the charging/discharging stand 200 remains OFF until a time t10. In this state, the relay 208 is OFF, and the potential of the pilot signal CPLT is 0 V. In addition, the potential of the proximity detection signal PISW is V11 (>0).

At the time t10, when the charging/discharging stand 200 is turned ON, the CPLT oscillator circuit 202 generates the pilot signal CPLT.

At the time t10, the charging/discharging connector 220 is not connected to the inlet 60. In addition, the potential of the pilot signal CPLT is V1 (12 V, for example), and the pilot signal CPLT is in a non-oscillation state.

At a time t11, when the charging/discharging connector 220 is connected to the inlet 60, the potential of the proximity detection signal PISW is lowered by the resistors R11, R12. In FIG. 6, since the charging/discharging connector 220 is fitted to the inlet 60, the switch SW12 is released, and the potential of the proximity detection signal PISW is lowered to V13 by the resistors R11, R12. Consequently, the proximity detection signal PISW is ON, and the CPU 51 detects the connection of the charging/discharging connector 220 and the inlet 60.

At this time, since the signal line for the control pilot signal CPLT is connected, the potential of the pilot signal CPLT is lowered to V2 (9 V, for example) by a pull-down resistor, which is not shown.

At a time t12, the stand control portion 206 detects that the potential of the pilot signal CPLT has been lowered to V2. Corresponding to this, the CPLT oscillator circuit 202 oscillates the control pilot signal CPLT.

When detecting the oscillation of the pilot signal CPLT, the CPU 51 also detects a rated current of the charging cable by the duty of the pilot signal CPLT.

Then, in order to start the charging operation, the CPU 51 connects the pull-down resistor, which is not shown, thereby lowering the high-level potential of the pilot signal CPLT to V3 (6 V, for example) (a time t13 onward in FIG. 6).

At this time, the CPU 51 concurrently transmits the information on the connecting state between the charging/discharging connector 220 and the inlet 60, which is detected on the basis of the level of the proximity detection signal PISW, to the HLC unit 104 from the time t12 to t13.

In a case where both of the connecting state of the connector that is indicated by the control pilot signal CPLT itself and the connecting state of the connector that is determined by the proximity detection signal PISW transmitted through the HLC communication are appropriate for charging, the HEMS 305 determines that the vehicle can be charged, and conducts the relay 208 at a time t14.

Then, when a voltage sensor on the vehicle side, which is not shown, detects the AC voltage of the electric power lines ACL1, ACL2, the electronic control unit 50 closes a contact of the relay RY1 (FIG. 2) and controls the charger 31 (FIG. 2), and charging of the electric power storage device B (FIG. 2) is thereby started (at a time t15 in FIG. 4). While the charging process is performed, the indicator 306 either indicates nothing or a charging condition and the like. In other words, it can be said that a detector with a function to detect whether the connecting state of the charging/discharging connector 220 is the fully fitted state or the half-fitted state includes the electronic control unit 50.

When charging of the electric power storage device B is progressed and it is determined that the electric power storage device B is fully charged, the CPU 51 stops the charging process (a time t16 in FIG. 6) and disconnects the pull-down resistor, which is not shown (a time t17 in FIG. 6). Consequently, the potential of the pilot signal CPLT is increased to V2, the relay 208 is brought into the non-conductive state (a time t18 in FIG. 6), and the charging operation is finished.

FIG. 7 is a time chart for illustrating the charging operation when the charging/discharging connector 220 is half-fitted to the inlet 60.

Referring to FIG. 4 and FIG. 7, the charging/discharging stand 200 is turned ON at a time t20, and the charging/discharging connector 220 is connected to the inlet 60 at a time t21.

However, in FIG. 7, since the connection between the charging/discharging connector 220 and the inlet 60 is improper, the switch SW12 remains closed, and the potential of the proximity detection signal PISW becomes V12. At this time, although the control pilot signal CPLT indicates that the connector is connected, the proximity detection signal PISW remains off (half-fitted).

Accordingly, the CPU 51 detects that the charging/discharging connector 220 is half-fitted to the inlet 60.

The stand control portion 206 detects that the potential of the pilot signal CPLT is lowered to V2 at the time t21. Corresponding to the detection, the stand control portion 206 brings the pilot signal CPLT into an oscillation state (a time t22 in FIG. 7). However, since the CPU 51 has detected that the charging/discharging connector 220 is in the half-fitted state, the CPU 51 does not connect the pull-down resistor, which is not shown. Consequently, the potential of the pilot signal CPLT is not lowered to V3, and the relay 208 is maintained to be OFF. Thus, the charging operation is not started.

Meanwhile, between the time t22 and a time t23, the CPU 51 uses the HLC unit 104 to transmit the information indicating that the proximity detection signal PISW is OFF (that is, the half-fitted state) to the stand control portion 206. Then, if the OFF state of the proximity detection signal PISW continues for a predetermined period, the CPU 51 determines that the charging operation cannot be performed due to the half-fitted state, and thereby stops charging at the time t23.

In addition, at the time t23, the HEMS 305 obtains the information on the half-fitted state from the stand control portion 206, and displays a message on the indicator 306. Any message can be displayed as long as it indicates abnormal connection of the connector and thus promotes reconnection, such as "Cannot be charged. Please check connection of connector.".

The user recognizes from the message that there is a problem with the connection of the connector, thus pulls the connector at a time t24, and reconnects the connector. After the reconnection, charging is started as in the time chart shown in FIG. 6.

As it has been described so far, the charging system of this embodiment can inform the user even when the connector is half-fitted to the inlet. Accordingly, it is possible to prevent such inconvenience that, although the connector is inserted in the inlet at night, it turns out that the vehicle is not charged in the morning, for example.

Lastly, referring again to FIG. 2, FIG. 4, and the like, this embodiment will be summarized. The charging system of this embodiment is equipped with the electric power storage device B, and also includes the vehicle 100, the charging/discharging connector 220, the electronic control unit 50, and the indicator 306. The vehicle 100 is provided with the charging connection portion (a cable connecting port or the inlet 60) for charging the electric power storage device B. The charging/discharging connector 220 is attached to and detached from the inlet 60, and is connected to the inlet 60 in either the fully fitted state, in which charging can be performed, or the half-fitted state, in which charging is not allowed. The electronic control unit 50 detects whether the connecting state of the charging/discharging connector 220 is the fully fitted state or the half-fitted state. Based on the detection result of the electronic control unit 50, when the charging/discharging connector 220 is connected in the half-fitted state, the indicator 306 informs the user of the abnormal connection of the charging/discharging connector 220.

The electronic control unit 50 is provided in the vehicle 100 and detects the connecting state of the charging/discharging connector 220 on the basis of a first signal and a second signal that are provided from the charging/discharging connector 220 via the inlet 60. When either one of the first signal and the second signal indicates the half-fitted state, the electronic control unit 50 activates the indicator 306.

The first signal indicates presence or absence of the connection of the charging/discharging connector 220 to the inlet 60, and can be detected by both of the vehicle 100 and the charging/discharging stand 200. The second signal indicates whether the connecting state of the charging/discharging connector 220 is the fully fitted state or the half-fitted state, in addition to the presence or absence of the connection of the charging/discharging connector 220 to the inlet 60. While the second signal can be detected by the vehicle 100, it cannot be detected by the charging/discharging stand 200. After detecting the second signal, the electronic control unit 50 in the vehicle transmits a state of the second signal to the charging/discharging stand 200 through communication.

Here, the first signal is the control pilot signal CPLT, and the second signal is the proximity detection signal PISW.

In addition, the electronic control unit 50 is an electronic control unit that is arranged in the vehicle 100. The charging system further includes the HEMS 305, which is provided in the house 300, which communicates with the electronic control unit 50 through the stand control portion 206 to obtain the state of the second signal, and which controls the indicator 306 on the basis of the obtained state of the second signal.

Furthermore, as shown in FIG. 4, the charging/discharging connector 220 includes the first terminal T1, the second terminal T2, the locking claw 316, and the operation button 314 that the user operates the locking claw 316 therethrough. The locking claw 316 is locked to prevent detachment of the charging/discharging connector 220 from the inlet 60. The inlet 60 includes the third terminal T3, which corresponds to the first terminal T1, and the fourth terminal T4, which corresponds to the second terminal T2. The first signal goes through the first terminal and the third terminal. The operation button 314 also functions as a transmission switch that changes the second signal in such a manner that the second signal indicates the half-fitted state when the operation is performed to unlock the locking claw 316, which is properly locked on the inlet 60. The second signal is transmitted to the inlet 60 side through the second terminal T2 and the fourth terminal T4.

In another aspect, this embodiment relates to the vehicle 100. The vehicle 100 includes the electric power storage device B, the inlet 60, and the electronic control unit 50. The inlet 60 charges the electric power storage device B from the outside of the vehicle. The electronic control unit 50 is attached to and detached from the inlet 60, and detects whether the connecting state of the charging/discharging connector 220 is the fully fitted state or the half-fitted state, the charging/discharging connector 220 being connected to the inlet 60 either in the fully fitted state, in which charging can be performed, or in the half-fitted state, in which charging is not allowed. The electronic control unit 50 activates the indicator 306 that informs the user of the abnormal connection of the charging/discharging connector 220 when the connecting state of the charging/discharging connector 220 is the half-fitted state.

In further another aspect, this embodiment discloses the charging/discharging stand 200 and the house 300 that are the charging facilities for charging the vehicle 100 including the electric power storage device B, the inlet 60, and the electronic control unit 50. The inlet 60 charges the electric power storage device B from the outside of the vehicle. The electronic control unit 50 is attached to and detached from the inlet 60, and detects whether the connecting state of the charging/discharging connector 220 is the fully fitted state or the half-fitted state, the charging/discharging connector 220 being connected to the inlet 60 either in the fully fitted state, in which charging can be performed, or in the half-fitted state, in which charging is not allowed. The charging/discharging stand 200 and the house 300 include the HEMS 305 and the indicator 306. The HEMS communicates with the electronic control unit 50 and obtains the connecting state of the charging/discharging connector 220. The indicator 306 is controlled by the HEMS 305, and informs the user of the abnormal connection of the charging/discharging connector 220 when the connecting state of the charging/discharging connector 220 is the half-fitted state.

By adopting the configuration, which has been described so far, it is possible to prevent the user from being unaware of the half-fitted state before a time elapses. This embodiment exemplifies a case where the half-fitted state during charging is informed. However, when the electric power is supplied from the vehicle to the house, it is also possible to inform the half-fitted state by the same configuration.

This embodiment also exemplifies a case where the HLC communication, by which the signal is superimposed on the control pilot signal, is used as the communication means. However, as the communication means for communicating the half-fitted state from the vehicle to the charging facility side, PLC communication for superimposing a signal on the electric power line may be used. Alternatively, the wireless communication may be used.

What is claimed is:

1. A charging system, comprising:
a vehicle to which an electric power storage device is installed, the vehicle being provided with a charging connection portion that charges the electric power storage device in a charging operation, the vehicle including an electronic control unit;

a connector configured to:
(a) be attached to and detached from the charging connection portion, and
(b) be connected to the charging connection portion in either a fully fitted state and a half-fitted state, the charging operation being able to be performed in the fully fitted state, and the charging operation being not allowed in the half-fitted state;

a detector configured to detect whether a connecting state of the connector is in the fully fitted state or the half-fitted state; and an informing portion configured to inform a user of abnormal connection of the connector based on a detection result of the detector when the connecting state of the connector is the half-fitted state, wherein the detector is provided in the vehicle, the detector is configured to detect the connecting state of the connector based on a first signal and a second signal, the first signal and the second signal are provided from the connector through the charging connection portion, the first signal being configured to:
indicate presence or absence of the connection of the connector to the charging connection portion, and
be detected by both of the vehicle and a charging facility, the second signal being configured to:
indicate whether the connecting state of the connector is the fully fitted state or the half-fitted state in addition to indicating the presence or absence of the connection of the connector to the charging connection portion, and
be detected by the vehicle but not detected by the charging facility, the detector is configured to activate the informing portion when either one of the first signal and the second signal indicates the half-fitted state, and the electronic control unit is configured to transmit a state of the second signal to the charging facility through communication after detecting the state of the second signal.

2. The charging system according to claim 1, wherein
the first signal includes a control pilot signal, and
the second signal includes a proximity detection signal.

3. The charging system according to claim 1, wherein
the detector includes an electronic control unit that is arranged in the vehicle, the charging system further comprising:
a home energy management system configured to:
(a) communicate with the electronic control unit to obtain a state of the second signal, and
(b) control the informing portion based on the obtained state of the second signal, and
the home energy management system being included in a house.

4. The charging system according to claim 1, wherein
the connector includes a first terminal, a second terminal, a locking portion and an operating portion, the locking portion locks to prevent detachment of the connector from the charging connection portion, the operating portion is configured such that the user operates the locking portion, the charging connection portion includes a third terminal and a fourth terminal, the third terminal corresponds to the first terminal, the fourth terminal corresponds to the second terminal, the first signal goes through the first terminal and the third terminal, the operating portion also functions as a transmission switch that changes the second signal in such a manner that the second signal indicates the half-fitted state when the locking portion is operated to be unlocked from a properly locked state on the charging connection portion, and the second signal is transmitted to the charging connection portion side through the second terminal and the fourth terminal.

5. The charging system according to claim 1, wherein
the connector includes a charging/discharging connector that is connected to the charging connection portion in order to charge and discharge the electric power storage device.

6. The charging system according to claim 1, wherein
the informing portion includes an indicator that informs the user of the state of the connection of the connector by display.

7. A vehicle comprising:
an electric power storage device;
a charging connection portion configured to charge the electric power storage device from outside of the vehicle; and
an electronic control unit configured to:
(a) detect whether a connecting state of a connector is a fully fitted state or a half-fitted state, when the connector is connected to the charging connection portion, charging being able to be performed in the fully fitted state, the charging being not allowed in the half-fitted state, and the connector being attachable to and detachable from the charging connection portion, and
(b) activate an informing portion that informs a user of abnormal connection of the connector when the connecting state of the connector is the half-fitted state, wherein the electronic control unit is configured to detect the connecting state of the connector based on a first signal and a second signal, the first signal and the second signal are provided from the connector through the charging connection portion, and the electronic control unit is configured to activate the informing portion when either one of the first signal and the second signal indicates the half-fitted state.

8. A charging facility for charging a vehicle,
the vehicle including:
an electric power storage device;
a charging connection portion configured to charge the electric power storage device from outside of the vehicle; and
an electronic control unit configured to detect whether a connecting state of a connector is a fully fitted state or a half-fitted state, when a connector is connected to the charging connection portion, charging being able to be performed in the fully fitted state, the charging being not allowed in the half-fitted state, and the connector being attachable to and detachable from the charging connection portion, the electronic control unit being configured to detect the connecting state of the connector based on a first signal and a second signal, the first signal and the second signal being provided from the connector through the charging connection portion, the charging facility comprising:
- a home energy management system that communicates with the electronic control unit to obtain the connecting state of the connector; and
- an informing portion configured to:
  - (a) be controlled by the home energy management system, and
  - (b) inform a user of abnormal connection of the connector when the connecting state of the connector is the half-fitted state, wherein
- the home energy management system is configured to activate the informing portion when either one of the first signal and the second signal indicates the half-fitted state.

* * * * *